United States Patent
Hu et al.

(10) Patent No.: US 9,832,130 B2
(45) Date of Patent: Nov. 28, 2017

(54) DATA PACKET ROUTING METHOD AND DEVICE

(71) Applicant: Huawei Technologies Co., Ltd., Shenzhen, Guangdong (CN)

(72) Inventors: Weihua Hu, Shanghai (CN); Han Zhou, Shanghai (CN); Yan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 14/965,443

(22) Filed: Dec. 10, 2015

(65) Prior Publication Data
US 2016/0099874 A1    Apr. 7, 2016

Related U.S. Application Data

(63) Continuation of application No. PCT/CN2013/077247, filed on Jun. 14, 2013.

(51) Int. Cl.
| | |
|---|---|
| *H04L 1/00* | (2006.01) |
| *H04L 12/801* | (2013.01) |
| *H04L 12/64* | (2006.01) |
| *H04L 12/66* | (2006.01) |
| *H04L 12/721* | (2013.01) |
| *H04L 12/741* | (2013.01) |
| *H04L 12/851* | (2013.01) |
| *H04L 12/717* | (2013.01) |
| *H04L 12/24* | (2006.01) |

(52) U.S. Cl.
CPC .......... *H04L 47/14* (2013.01); *H04L 12/6418* (2013.01); *H04L 12/66* (2013.01);
(Continued)

(58) Field of Classification Search
CPC ........ H04L 47/11; H04L 47/115; H04L 47/26; H04L 47/33; H04L 47/35; H04W 28/0215;
(Continued)

(56) References Cited

U.S. PATENT DOCUMENTS

| | | | |
|---|---|---|---|
| 2005/0094572 A1* | 5/2005 | Mimura | ................ H04L 1/0026 370/252 |
| 2009/0063688 A1 | 3/2009 | Bagepalli et al. | |

(Continued)

FOREIGN PATENT DOCUMENTS

| | | |
|---|---|---|
| CN | 101087299 A | 12/2007 |
| CN | 101175033 A | 5/2008 |

(Continued)

OTHER PUBLICATIONS

P. Quinn et al., "Network Service Header", Network Working Group, Jun. 13, 2013, 20 pages.

(Continued)

*Primary Examiner* — Dady Chery

(57) ABSTRACT

The present invention provides a data packet routing method and device. When a Switch receives, form an SE, a traffic flow on which service processing is performed, the Switch can determine a forwarding rule of a corresponding service chain according to the traffic flow received from the SE, and route, according to the forwarding rule, a data packet received from the SE. Compared with a case in the prior art in which an SPC needs to deliver a forwarding rule corresponding to each traffic flow to a Switch, the embodiments of the present invention adopt the technical solutions in which the SPC only needs to deliver a forwarding rule corresponding to each service chain to the Switch, thereby reducing signaling interaction between the SPC and the Switch and saving a network overhead.

14 Claims, 6 Drawing Sheets

(52) U.S. Cl.
CPC .............. *H04L 45/38* (2013.01); *H04L 45/42* (2013.01); *H04L 45/745* (2013.01); *H04L 47/2408* (2013.01); *H04L 41/08* (2013.01)

(58) Field of Classification Search
CPC ......... H04W 28/0221; H04W 28/0226; H04W 28/0231; H04W 28/0236; H04W 28/0242; H04W 28/0278; H04J 3/12; H04M 7/1265; H04M 7/127
USPC .................................................. 370/389–455
See application file for complete search history.

(56) References Cited

U.S. PATENT DOCUMENTS

| | | | |
|---|---|---|---|
| 2012/0314605 | A1* | 12/2012 | Akiyoshi ................ H04L 45/30 370/252 |
| 2013/0064243 | A1* | 3/2013 | Akiyoshi ................ H04L 45/38 370/389 |
| 2014/0334295 | A1* | 11/2014 | Guichard ............ H04L 47/2441 370/230 |

FOREIGN PATENT DOCUMENTS

| | | |
|---|---|---|
| CN | 101400083 A | 4/2009 |
| CN | 102624616 A | 8/2012 |
| EP | 2 768 196 A1 | 8/2014 |
| WO | WO 2012/126423 A2 | 9/2012 |

OTHER PUBLICATIONS

Dilip A. Joseph et al., "A Policy-aware Switching Layer for Data Centers", SIGCOMM'08, Aug. 17-22, 2008, p. 51-62.
"Cisco Nexus 1000V Series Switches: Deploy Cisco vPath Service-Chaining Architecture", Cisco, Aug. 2012, 4 pages.

* cited by examiner

DATA PACKET ROUTING METHOD AND DEVICE

CROSS-REFERENCE TO RELATED APPLICATIONS

This application is a continuation of International Application No. PCT/CN2013/077247, filed on Jun. 14, 2013, which is hereby incorporated by reference in its entirety.

TECHNICAL FIELD

The present invention relates to the field of communications technologies, and in particular, to a data packet routing method and device.

BACKGROUND

In order to process value-added service data (for example, content optimization for data or acceleration of a value-added service) over a Gi interface between a GGSN (gateway GPRS support node and a PGW (evolved packet core network device), a value-added service server may be connected in series to the Gi interface between the GGSN and the PGW. FIG. 1 is a schematic diagram of a system architecture in which a Gi interface is connected in series to 4 value-added service servers. The value-added service server may also be referred to as an SE (service enabler), such as a video optimizer, a traffic flow compressor, a data buffer, a deep packet probe, or an HTTP header intensifier.

In the system architecture shown in FIG. 1, the Gi interface is connected in series to the SEs, and a traffic flow passes through each of the SEs. However, in an actual routing process, not all traffic flows need to pass through each SE. In view of this, a transmission path of the traffic flow may be optimized, so that traffic flows of different types are routed according to their respective routing rules. For example, traffic flows of some types need to pass through all SEs, while traffic flows of some types need to pass through some SEs, and traffic flows of some types may even not need to pass through an SE.

In order to optimize a path along which a traffic flow passes through an SE so that traffic flows of different types can be routed according to their respective routing rules, a service-based routing control system shown in FIG. 2 is proposed in the industry, where the routing control system includes: an STC (service traffic classifier), an SPC (service path controller), a Switch (a programmable switch), and an SE.

The routing control system may include at least one Switch and at least one SE. The STC and the SE are directly connected to the Switch, each Switch may be connected to the at least one SE, and Switches may be directly interconnected or interconnected through a standard switch network. The Switch herein refers to a switch in which a flow table entry can be controlled by an external controller by means of programming through an external open interface, such as an OpenFlow switch.

The STC is used for identifying an application type of a traffic flow, such as a video application, a P2P application, an FTP downloading application, or a Web browsing application, and reporting information about the traffic flow and a corresponding service routing rule to the SPC through an Sts interface. In addition, different traffic flows may have a same service routing rule, and traffic flows having a same service routing rule may be considered as traffic flows corresponding to a same service chain; therefore, the STC may also report information about a service chain and a corresponding service routing rule to the SPC. If receiving information about the traffic flow and the corresponding service routing rule, the SPC may directly determine the service routing rule of the traffic flow corresponding to the information about the traffic flow; or if receiving information about the service chain and the corresponding service routing rule, the SPC may determine the corresponding service chain according to the information about the service chain, and then determine the service routing rule of the traffic flows corresponding to the service chain.

The information about a traffic flow is information used for identifying the traffic flow, for example, quintuple information (a source IP address, a destination IP address, a protocol type, a source port number, and a destination port number) about the traffic flow.

The information about a service chain is information used for identifying the service chain which the traffic flows having a same service routing rule are all corresponding to; for example, if a same tunnel identifier is used to perform tunnel encapsulation on data packets in the traffic flows having the same service routing rule, the tunnel identifier may be used as the information about the service chain.

The service routing rule includes a path of routing a traffic flow along a plurality of nodes. The service routing rule may include at least one routing path, where each routing path indicates a routing process in which the traffic flow passes from one node to another node. Using an SE that functions as the node as an example, the combination of the routing paths in the service routing rule may be: SE information sequentially arranged according to a routing order of the traffic flows, where the SE information may be information capable of uniquely identifying the SE, such as a name, an identifier, an IP address, or a MAC address of the SE.

After receiving the information about the traffic flow and the corresponding service routing rule, or, the information about the service chain and the corresponding service routing rule that are sent by the STC, the SPC may determine, according to resource topology information (that is, information about a topology among the Switches, the SEs, and the STC), a path (that is, Switch ports and SEs which are passed through during routing) which the traffic flow passes through when the traffic flow is routed according to sequentially arranged SEs, and generate at least one forwarding rule adaptive to the service routing rule for each Switch on the path, where the forwarding rule includes a routing path of the traffic flow from one node to an adjacent node. The SPC delivers the generated forwarding rule to a Switch which the traffic flow passes through during routing; specifically, the SPC may deliver the forwarding rule in the form of a flow table entry to the Switch. When receiving the traffic flow, the Switch may determine at least one corresponding forwarding rule according to information about the traffic flow (such as quintuple information about the traffic flow) or information about a service chain, and perform routing processing on a data packet in the traffic flow according to the forwarding rule.

When traffic flows corresponding to different service chains need to undergo service processing by using a plurality of SEs connected to different ports of a Switch, a network overhead in the current processing manner is relatively high.

SUMMARY

Embodiments of the present invention describe a data packet routing method and device, so as to solve a problem of a relatively high network overhead in the prior art.

A first aspect provides a data packet routing method, including: a switch receives a data packet sent by a service enabler SE, obtains, according to a traffic flow which the data packet received from the SE belongs to, a forwarding rule of a service chain corresponding to the traffic flow, and routes, according to the forwarding rule, the data packet received from the SE.

A second aspect provides a data packet routing device, including: a packet receiving unit, a forwarding rule obtaining unit and a routing unit. The packet receiving unit is configured to receive a data packet sent by a service enabler SE. The forwarding rule obtaining unit is configured to obtain, according to a traffic flow which the data packet received from the SE belongs to, a forwarding rule of a service chain corresponding to the traffic flow. The routing unit is configured to route, according to the forwarding rule, the data packet received from the SE.

A third aspect provides a data packet routing device, including: a communication interface and a processor. The communication interface is configured to interact with an external network device. The processor is configured to receive, through the communication interface, a data packet sent by an SE, obtain, according to a traffic flow which the data packet received from the SE belongs to, a forwarding rule of a service chain corresponding to the traffic flow, and route, according to the forwarding rule, the data packet received from the SE.

In the solutions of the embodiments of the present invention, when a Switch receives, from an SE, a traffic flow on which service processing is performed, the Switch can determine a forwarding rule of a corresponding service chain according to the traffic flow received from the SE, and route, according to the forwarding rule, a data packet received from the SE. Compared with a case in the prior art in which an SPC needs to deliver a forwarding rule corresponding to each traffic flow to a Switch, the embodiments of the present invention adopt the technical solutions in which the SPC only needs to deliver a forwarding rule corresponding to each service chain to the Switch, thereby reducing signaling interaction between the SPC and the Switch and saving a network overhead.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
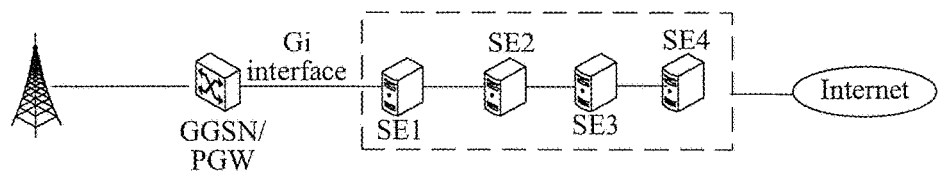
FIG. 1 is a schematic diagram of a system architecture in which a Gi interface is connected in series to 4 value-added service servers according to the prior art.
Figure 2:
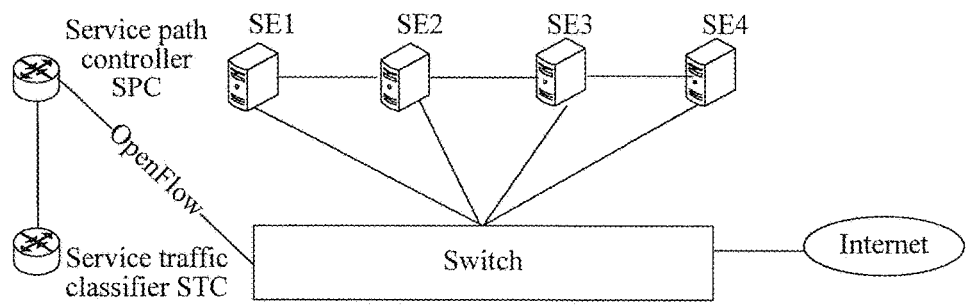
FIG. 2 is a schematic diagram of a service-based routing control system according to the prior art.

In an actual network deployment, a plurality of traffic flows (that is, traffic flows with different quintuple content) may be routed according to a same forwarding rule. For example, a forwarding rule of a traffic flow of an FTP downloading application is that: after being processed by SE1, the traffic flow is sent by a Switch to the Internet; and a forwarding rule of a traffic flow of a Web browsing application is also that: after being processed by SE1, the traffic flow is sent by the Switch to the Internet. In this case, routing paths of the two traffic flows of different application types in the routing control system shown in FIG. 2 are the same; therefore, an STC may send information about a service chain and a corresponding service routing rule to an SPC.

For example, after identifying the traffic flow of the FTP downloading application and the traffic flow of the Web browsing application, the STC determines that service routing rules of the two types of traffic flows are the same, and the STC may send information about a service chain (for example, a same tunnel identifier used when tunnel encapsulation is performed on data packets in the two types of traffic flows) and the corresponding service routing rule to the SPC. The SPC generates, according to the received information about the service chain and the corresponding service routing rule, a forwarding rule that matches the service routing rule and is associated with the information about the service chain, and delivers the forwarding rule to a Switch.

Figure 3:
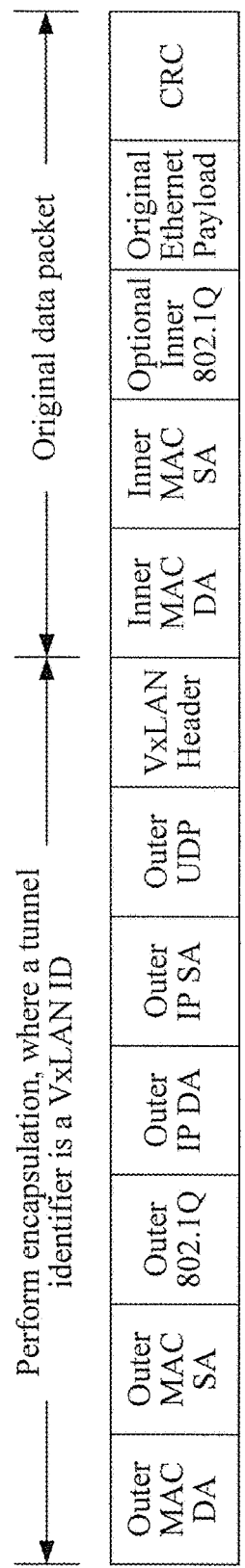
FIG. 3 is a schematic structural diagram of a data packet encapsulated with information about a service chain.

When routing of the traffic flows starts, the STC performs tunnel encapsulation on the data packets in the traffic flow of the FTP downloading application and the traffic flow of the Web browsing application, to encapsulate a same tunnel identifier into outer layers of the data packets. Taking a VxLAN ID used as the tunnel identifier as an example, a structure of the data packet in the traffic flow after encapsulation is shown in FIG. 3, in which a VxLAN Header field stores the VxLAN ID. When the data packets encapsulated with the tunnel identifier arrive at the Switch, the Switch routes the traffic flow of the FTP downloading application and the traffic flow of the Web browsing application according to the forwarding rule pre-delivered by the SPC and associated with the tunnel identifier.

Compared with a manner in which the SPC receives information about a traffic flow and a corresponding service routing rule that are sent by the STC, the manner in which the SPC receives the information about the service chain and the corresponding service routing rule has the following advantages: for a plurality of traffic flows having a same forwarding rule, the SPC can deliver, to the Switch, a forwarding rule of a service chain corresponding to the plurality of traffic flows having the same forwarding rule; and the Switch can process, according to the forwarding rule, the traffic flows corresponding to the same service chain; in comparison with a case in which the SPC delivers a corresponding forwarding rule to the Switch for each traffic flow, signaling interaction between the SPC and the Switch can be reduced; in addition, rules stored in the Switch are reduced, and a storage space of the Switch is saved.

Specifically, in solutions of embodiments of the present invention, when a data packet encapsulated with a tunnel identifier arrives at a Switch, the Switch decapsulates the data packet and removes the tunnel identifier, and then sends the decapsulated data packet to an SE according to a corresponding forwarding rule; and the SE processes the data packet and then sends the processed data packet back to the Switch. Because the SE is a third-party service enabler that does not have a capability of perceiving a service chain corresponding to a traffic flow which the data packet belongs to, the data packet sent back by the SE and received by the Switch does not include the tunnel identifier. In order to implement correct routing of the data packet sent back by the SE, in the solutions of the embodiments of the present invention, the Switch obtains, according to the traffic flow which the data packet sent back by the SE belongs to, a forwarding rule of the service chain corresponding to the traffic flow, and then routes, by using the forwarding rule, the data packet sent back by the SE, so that the Switch correctly routes, according to the information about the service chain and the corresponding forwarding rule that are delivered by an SPC, the data packet not including the information about the service chain and sent back by the SE; therefore, the solutions of the embodiments of the present invention are more versatile and flexible in addition to reducing signaling interaction between an STC and the SPC and between the SPC and the Switch.

The following describes in detail exemplary embodiments of the present invention with reference to the accompanying drawings.

Embodiment 1

Figure 4:
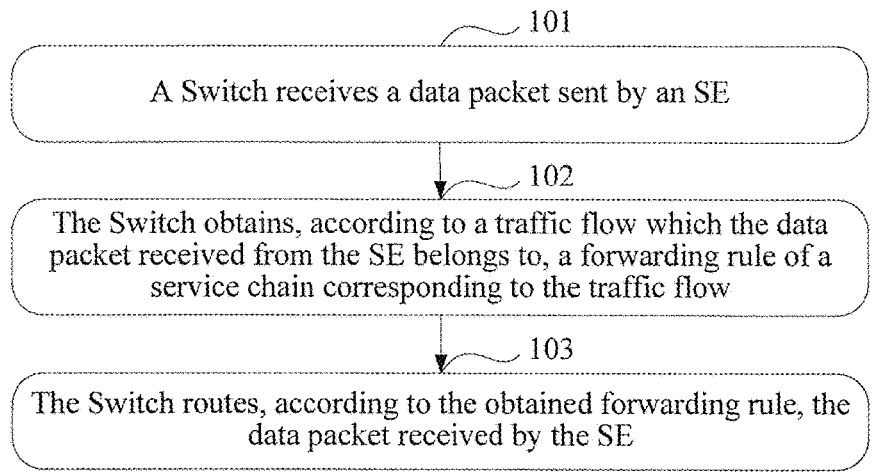
FIG. 4 is a flow chart of steps of a data packet routing method according to Embodiment 1 of the present invention.

FIG. 4 is a flow chart of steps of a data packet routing method according to Embodiment 1 of the present invention. The method mainly includes the following steps:

Step 101: A Switch receives a data packet sent by an SE.

In the solution in Embodiment 1 of the present invention, the Switch may receive a data packet sent by an SE or another network device. When the Switch receives the data packet sent by the SE, because the SE is a third-party service enabler that does not have a capability of perceiving a service chain corresponding to a traffic flow which the data packet belongs to, the data packet sent by the SE and received by the Switch does not include information about the service chain.

Step 102: The Switch obtains, according to the traffic flow which the data packet received from the SE belongs to, a forwarding rule of a service chain corresponding to the traffic flow.

In the solution of step 102, the Switch may determine, according to a pre-saved correspondence between the traffic flow and the service chain, the service chain corresponding to the traffic flow which the data packet received from the SE belongs to, and then determine the forwarding rule of the service chain; or the Switch may determine, according to a pre-saved correspondence between the traffic flow and the forwarding rule of the service chain, the forwarding rule of the service chain corresponding to the traffic flow which the data packet received from the SE belongs to.

Step 103: The Switch routes, according to the obtained forwarding rule, the data packet received from the SE.

In the solution of Embodiment 1 of the present invention, when receiving a data packet not including information about a service chain from an SE, a Switch can still obtain a forwarding rule of the corresponding service chain according to a traffic flow which the data packet belongs to and route the received data packet, so that the Switch correctly routes, according to the information about the service chain and the corresponding forwarding rule that are delivered by an SPC, the data packet not including the information about the service chain and sent by the SE; therefore, the solution of Embodiment 1 of the present invention is more versatile and flexible in addition to reducing signaling interaction between an STC and the SPC and between the SPC and the Switch.

The following describes in detail the solution of Embodiment 2 of the present invention by using a specific embodiment.

Figure 5:
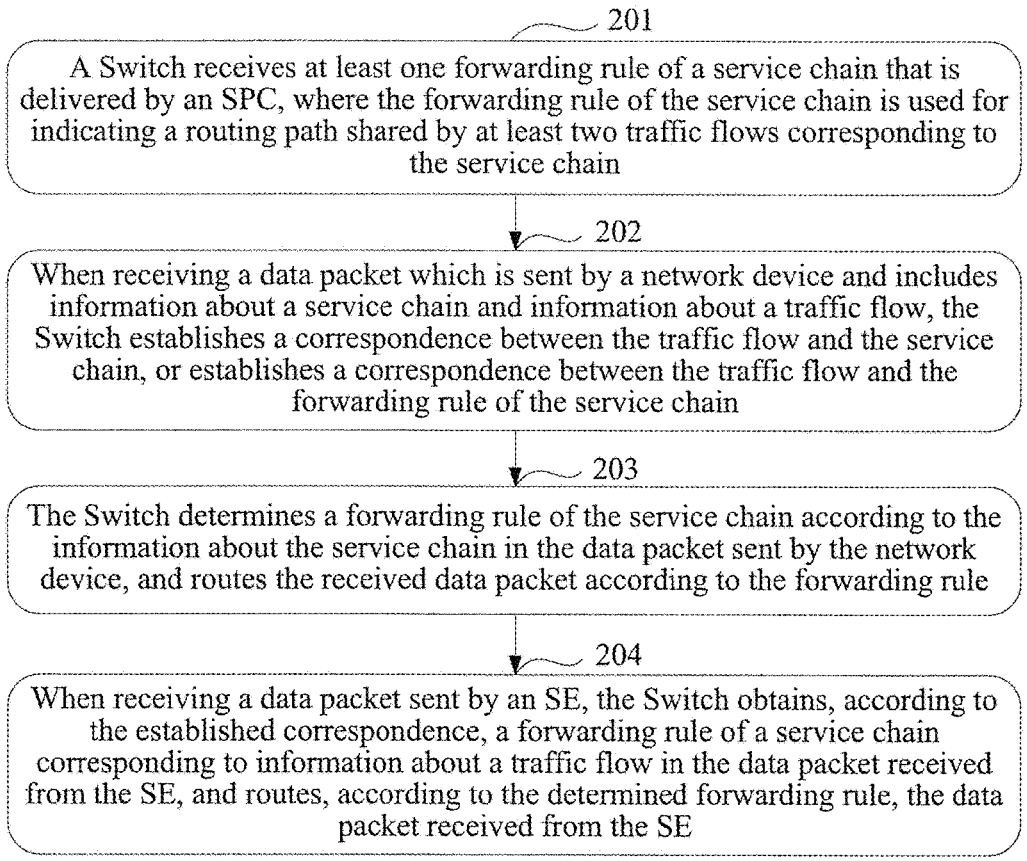
FIG. 5 is a flow chart of steps of a data packet routing method according to Embodiment 2 of the present invention.

FIG. 5 is a flow chart of steps of a data packet routing method according to Embodiment 2 of the present invention. The method mainly includes the following steps:

Step 201: A Switch receives at least one forwarding rule of a service chain delivered by an SPC, where the forwarding rule of the service chain is used for indicating a routing path shared by at least two traffic flows corresponding to the service chain.

Step 201 may be an exemplary step for implementing the embodiment of the present invention, and a manner of obtaining the forwarding rule of the service chain by the Switch is not limited to the manner described in step 201.

An example of a routing path defined in a forwarding rule is that: after traffic flow a arrives at the Switch from a port, the Switch can route the traffic flow to an SE or another network device according to the routing path defined in the forwarding rule.

The SPC may deliver the forwarding rule to the Switch through a programmable interface (for example, an OpenFlow protocol interface).

The forwarding rule delivered by the SPC to the Switch may be described in the form of a flow table entry or in other forms, and a manner of describing the forwarding rule is not limited in the embodiment of the present invention.

The forwarding rule may further include information about the service chain. In the solution of this embodiment, the information about the service chain includes but is not limited to a tunnel identifier (such as a VLAN ID, a VxLAN ID, or a GRE Key), a service identifier (for example, a Service ID), or other information indicating the service chain corresponding to the at least two traffic flows having the same forwarding rule; and the information about the service chain is not limited in the embodiment of the present invention.

The information about the service chain may be included in the forwarding rule after being generated by the SPC and is then sent to the Switch, or may also be sent to the SPC after being generated by another network device (for example, an STC), and then the SPC adds the information about the service chain into the forwarding rule and sends the forwarding rule to the Switch. A device generating the information about the service chain is not limited in the embodiment of the present invention.

When receiving a forwarding rule delivered by the SPC, the Switch locally saves the forwarding rule, and an optional saving manner is as follows:

after receiving at least one forwarding rule which is delivered by the SPC and corresponding to a service chain, the Switch may generate a flow table entry corresponding to each forwarding rule, so as to save the received forwarding rule in the form of the flow table entry.

A match field and an instruction field are defined in the flow table entry, where the match field includes the information about the service chain, and the instruction field includes the corresponding forwarding rule.

When the Switch receives a data packet sent by a network device, where the data packet includes information about a traffic flow and the information about the service chain, the Switch may compare the information about the service chain included in the data packet with information in the match fields of the flow table entries, and search for a flow table entry of which the match field includes information about a service chain same as that of the received data packet, and then obtain an instruction field in the flow table entry, to determine a forwarding rule in the instruction field.

Step 202: When receiving the data packet which is sent by a network device and includes the information about the service chain and the information about the traffic flow, the Switch establishes a correspondence between the traffic flow and the service chain, or establishes a correspondence between the traffic flow and a forwarding rule of the service chain.

Step 202 is an exemplary step of the embodiment of the present invention. The Switch may establish at least one of the foregoing two correspondences according to the data packet which is sent by the network device and includes the information about the service chain and the information about the traffic flow, but the Switch may also determine the correspondence in another manner, which is not limited in the solution of this embodiment; for example, the at least one of the foregoing two correspondences may be delivered by the SPC to the Switch.

Using the case in which the Switch establishes one of the foregoing two correspondences according to the information about the service chain and the information about the traffic flow in the data packet received in step 202 as an example, an implementation manner of step 202 is described in detail below.

The information about the traffic flow in the data packet received by the Switch in step 202 may be any information capable of identifying the traffic flow, such as a quintuple (including a modified quintuple) of the traffic flow, part (such as a source IP address and a destination IP address) of the content of the quintuple, part of the content of the modified quintuple, or a VLAN tag used in the data packet in the traffic flow. A form of the information about the traffic flow is not limited in the embodiment of the present invention.

Using the information about the traffic flow in a form of a quintuple of the traffic flow and the information about the service chain in a form of a tunnel identifier as an example, the establishing, by the Switch, one of the foregoing two correspondences in step 202 are separately described as follows:

1: The Switch establishes the correspondence between the traffic flow and the service chain.

Specifically, the Switch generates the correspondence in the form of a flow table entry between the quintuple of the traffic flow and the tunnel identifier of the service chain.

Alternatively, the Switch generates a setting table such as a chain table or a Hash table, and inserts the quintuple of the traffic flow and the tunnel identifier of the service chain as elements into the setting table, so as to indicate the correspondence between the quintuple of the traffic flow and the tunnel identifier of the service chain.

2: The Switch establishes the correspondence between the traffic flow and the forwarding rule of the service chain.

Specifically, the Switch searches, by using the information about the service chain in the data packet received in step 202 as a search condition, the flow table entries generated in step 201 for a flow table entry of which a match field includes the content same as the information about the service chain, and then obtains information in an instruction field in the flow table entry found after searching, that is, obtains the forwarding rule of the service chain corresponding to the information about the service chain.

The Switch generates a flow table entry for the quintuple of the traffic flow and the forwarding rule of the service chain corresponding to the traffic flow, where the match field includes the quintuple of the traffic flow, and the instruction field includes the obtained forwarding rule of the service chain.

A presentation form of the correspondence established by the Switch is not limited in the embodiment of the present invention.

Optionally, in step 202, the Switch may determine whether to establish at least one of the foregoing two correspondences in the following manners:

Manner 1: It is determined, according to an instruction message included in the forwarding rule delivered by the SPC to the Switch, whether the Switch needs to execute the operation of establishing the at least one correspondence, and a feasible implementation means is as follows:

The SPC adds, in the forwarding rule delivered to the Switch, instruction information for establishing the at least one correspondence; for example, the SPC adds the instruction information in an Instruction field of a flow modification message, so as to instruct the Switch to establish the at least one correspondence when the Switch receives the data packet including the information about the traffic flow and the information about the service chain in step 202.

Manner 2: The Switch determines, according to locally stored configuration information, whether the operation of establishing the at least one correspondence needs to be executed, and a feasible implementation means is as follows:

The Switch locally stores configuration information, where the configuration information records the information about the traffic flow, such as a VLAN tag, a VxLAN ID, a source MAC address, a destination MAC address, a source IP address, a destination IP address, or a port number.

When receiving the data packet including the information about the traffic flow and the information about the service chain, the Switch obtains the information about the traffic flow, such as at least one of the VLAN tag, the VxLAN ID, the source MAC address, the destination MAC address, the source IP address, and the port number, according to the information recorded in the configuration information, and compares the obtained information about the traffic flow with the content in the configuration information; and if the obtained information about the traffic flow and the content in the configuration information match (including that the obtained information about the traffic flow is the same as the content in the configuration information, or that the obtained information about the traffic flow falls within a scope indicated by the content in the configuration information), the Switch determines that the operation of establishing the at least one correspondence needs to be executed.

For example, the configuration information stored in the Switch records a VLAN tag set; when receiving the data packet including the information about the traffic flow and the information about the service chain in step 202, the Switch obtains a VLAN tag of the data packet, and determines that the operation of establishing the at least one correspondence needs to be executed if the obtained VLAN tag of the data packet is included in the VLAN tag set in the configuration information.

Optionally, the SPC needs to learn whether the Switch has a capability of establishing the at least one correspondence, and after it is determined that the Switch has the capability of establishing the at least one correspondence, the solution of the embodiment of the present invention is executed.

An optional implementation manner is as follows:

A capability negotiation mechanism exists between the SPC and the Switch, so that the SPC can learn about whether the Switch has the capability of establishing the at least one correspondence. For example, the Switch may inform, in a manner of capability reporting, the SPC of whether the Switch has the capability of establishing the at least one correspondence. Using a case in which an OpenFlow protocol is used between the SPC and the Switch as an example, the Switch may add information about whether the Switch has the capability of establishing the at least one correspondence to a Feature list information element, and inform the SPC of the information.

Another optional implementation manner is as follows:

The SPC records, in configuration information, information about the Switch having the capability of establishing the at least one correspondence, for example, records, in the configuration information, address information about the Switch having the capability of establishing the at least one correspondence; and the SPC may learn about, according to content recorded in the configuration information, whether the Switch has the capability of establishing the at least one correspondence.

Step 203: The Switch determines a forwarding rule of the service chain according to the information about the service chain in the data packet sent by the network device, and routes the received data packet according to the forwarding rule.

Using the case in which the Switch saves the forwarding rule delivered by the SPC in the form of the flow table entry in step 201 as an example, in step 203, the Switch extracts the information about the service chain from the received data packet, compares the extracted information about the service chain with the match fields of the flow table entries in step 201, and searches for a flow table entry of which a match field includes content same as the information about the service chain included in the data packet in this step, and obtains a forwarding rule in an instruction field from the flow table entry found after searching.

The Switch may decapsulate the received data packet, remove the information about the service chain from a packet header, and then route the received data packet according to the forwarding rule in the instruction field of the flow table entry found after searching.

Step 204: When receiving the data packet sent by the SE, the Switch obtains, according to the established correspondence, a forwarding rule of a service chain corresponding to information about a traffic flow in the data packet received from the SE, and routes, according to the determined forwarding rule, the data packet received from the SE.

It should be noted that in step 202, the process in which the Switch establishes the correspondence in step 202 and the process in which the Switch processes the data packet from the SE by using the correspondence in step 204 may be two independent processes; after establishing the correspondence, the Switch may apply the correspondence in a process of processing a data packet belonging to a traffic flow that is the traffic flow in the correspondence.

In step 203, after decapsulating the received data packet and removing the information about the service chain, the Switch may route the decapsulated data packet to the SE; and after processing the received data packet, the SE sends the processed data packet back to the Switch, and in this case, the data packet received by the Switch does not include the information about the service chain.

In this embodiment, the data packets processed in step 202 and step 204 are data packets belonging to a same traffic flow, that is, the data packet processed in step 202 and the data packet processed in step 204 include a same traffic flow identifier, and the same traffic flow which the data packets belong to correspond to a same service chain.

If the correspondence between the information about the traffic flow and the information about the service chain is established in step 202, in step 204, the information about the corresponding service chain may be determined according to the information about the traffic flow in the data packet received from the SE; then, the flow table entries generated in step 201 are searched, by using the determined information about the service chain as a search condition, for a flow table entry of which a match field includes the content same as the determined information about the service chain; and afterwards, the data packet received from the SE is routed by using a forwarding rule in an instruction field of the flow table entry found after searching.

If the correspondence between the information about the traffic flow and the forwarding rule of the service chain corresponding to the traffic flow is established in step 202, in step 204, the forwarding rule of the corresponding service chain may be directly determined according to the information about the traffic flow in the data packet received from the SE, and then the data packet received from the SE is routed.

In the solution in Embodiment 2 of the present invention, by using a correspondence between a traffic flow and a service chain, or, a correspondence between a traffic flow and a forwarding rule of the service chain, when receiving a data packet sent back by an SE and not including information about the service chain, the Switch can also determine, according to the correspondence, a forwarding rule for routing the data packet sent back by the SE, so as to reduce signaling interaction between an STC and an SPC and between the SPC and the Switch, thereby solving a problem of heavy signaling load on a network element.

In the solution in Embodiment 2, there may be a plurality of presentation forms of the forwarding rule delivered by the SPC to the Switch and the correspondence established by the Switch, which are separately described through Embodiment 3, Embodiment 4, Embodiment 5, and Embodiment 6 as follows.

Embodiment 3

In a solution in Embodiment 3 of the present invention, the Switch encapsulates the data packet received from the SE according to the traffic flow which the data packet received from the SE belongs to and the correspondence between the traffic flow and the service chain, so that the encapsulated data packet includes the information about the service chain, and then the Switch can obtain information in the instruction field of the corresponding flow table entry according to the encapsulated data packet, so as to route the data packet; or the Switch obtains the information about the service chain according to the traffic flow which the data packet received from the SE belongs to and the correspondence between the traffic flow and the service chain, and obtains information in the instruction field of the corresponding flow table entry according to the obtained information about the service chain, so as to route the data packet. The following uses a case in which the Switch processes two traffic flows corresponding to different service chains as an example for description. In Embodiment 3, a correspondence established by the Switch is a correspondence between a traffic flow and a service chain that is established according to information about the traffic flow and information about the service chain.

Figure 6:
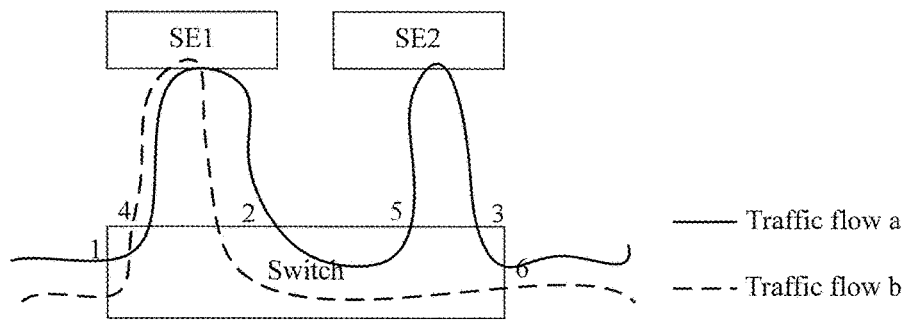
FIG. 6 is a schematic diagram showing that two service flows corresponding to different service chains are routed according to Embodiment 3 of the present invention.

FIG. 6 is a schematic diagram in which the Switch routes data packets of two traffic flows corresponding to different service chains. It is assumed that:

1) Traffic flow a is corresponding to service chain a, and a forwarding rule of service chain a is that: after flowing from the Switch to SE1 and SE2 and then back to the Switch, traffic flow a is sent by the Switch to an external network device (for example, a network element in the Internet).

2) Traffic flow b is corresponding to service chain b, and a forwarding rule of service chain b is that: after flowing from the Switch to SE1 and then back to the Switch, traffic flow b is sent by the Switch to the external network device.

3) Information about a service chain is a tunnel identifier, where a tunnel identifier of service chain a is Tunnel ID A, and a tunnel identifier of service chain b is Tunnel ID B.

4) Port 1, port 2, and port 3 are three input ports on the Switch; and port 4, port 5, and port 6 are three output ports on the Switch.

Based on content of FIG. 6 and the foregoing assumption, the process in which the Switch routes the data packets is described as follows:

The first step: An SPC delivers forwarding rules a of service chain a and forwarding rules b of service chain b to the Switch through a programmable interface.

A service chain may have at least one forwarding rule. In Embodiment 3, service chain a has three forwarding rules, which are forwarding rules separately used when traffic flow a is input to the Switch through port 1, port 2, and port 3; and service chain b has two forwarding rules, which are forwarding rules separately used when traffic flow b is input to the Switch through port 1 and port 2.

Figure 7:
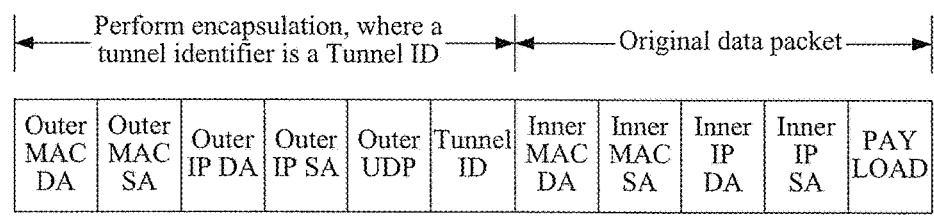
FIG. 7 is a schematic diagram of a format of a data packet which flows into a Switch according to Embodiment 3 of the present invention.

After receiving a forwarding rule, the Switch may save the forwarding rule in the form of a flow table entry (Embodiment 3 uses the form of the flow table entry as an example), and if a format of a data packet in a traffic flow flowing to the Switch is shown in FIG. 7, a forwarding rule saved in the form of a flow table entry by the Switch is described as follows:

Forwarding rule 1 of service chain a (flow table entry 1 of service chain a):
match field: an identifier (Tunnel ID A) of service chain a and port number 1 (Ingress Port1); and
instruction field: decapsulating a data packet in the traffic flow, removing Tunnel ID A, and sending the decapsulated data packet to SE1 through port 4.

An example of the Instruction field is as follows:
Decap Tunnel ID A (performing outer tunnel decapsulation on the data packet);
Inner MAC DA→SE1 MAC (changing an inner destination MAC address of the data packet into a MAC address of SE1); and Output→port4 (an output port is port 4).

Figure 8:
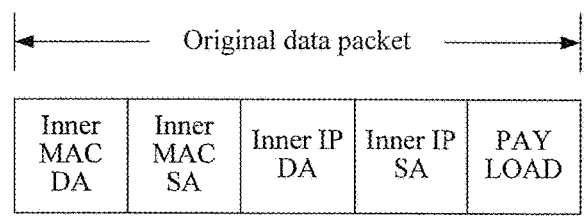
FIG. 8 is a schematic diagram of a format of a data packet which flows into a Switch and is processed according to forwarding rule 1 of service chain a according to Embodiment 3 of the present invention.

If the Switch processes traffic flow a according to forwarding rule 1 of service chain a, a format of a data packet in the traffic flow a is shown in FIG. 8.

Forwarding rule 2 of service chain a (flow table entry 2 of service chain a):
Match field: Tunnel ID A and Ingress Port2; and
Instruction field: decapsulating a data packet in the traffic flow, removing Tunnel ID A, and sending the decapsulated data packet to SE2 through port 5.

An example of the Instruction field is as follows:
Decap Tunnel ID A (performing outer tunnel decapsulation on the data packet);
Inner MAC DA→SE2 MAC (changing an inner destination MAC address of the data packet into a MAC address of SE2); and
Output→port5 (an output port is port 5).

If the Switch processes traffic flow a according to forwarding rule 2 of service chain a, a format of a data packet in the traffic flow is also as shown in FIG. 8, and a difference between this format and the format obtained in the case in which traffic flow a is processed according to forwarding rule 1 lies in that: the MAC address in Inner MAC DA varies.

Forwarding rule 3 of service chain a (flow table entry 3 of service chain a):
Match field: Tunnel ID A and Ingress Port3; and
Instruction field: decapsulating a data packet in the traffic flow, removing Tunnel ID A, and sending the decapsulated data packet to an external network device through port 6, where the external network device may be a network device (for example, a service server) which can perform Layer 2 (the following uses a MAC layer as an example) communication with the Switch, or may also be a network device which cannot perform Layer 2 communication with the Switch; and in the two cases, examples of the Instruction field are as follows:

In the case in which the external network device can perform MAC layer communication with the Switch, an example of the instruction field is as follows:
Decap Tunnel ID A (performing outer tunnel decapsulation on the data packet);
Inner MAC DA→external network device MAC (changing an inner destination MAC address of the data packet into a MAC address of the external network device); and
Output→port6 (an output port is port 6).

In the case in which the external network device can perform MAC layer communication with the Switch, after the Switch processes traffic flow a according to forwarding rule 3 of service chain a, a format of a data packet in the traffic flow is also as shown in FIG. 8, and a difference between this format and the format obtained in the case in which traffic flow a is processed according to forwarding rule 1 and forwarding rule 2 lies in that: the MAC address in Inner MAC DA varies.

In the case in which the external network device cannot perform MAC layer communication with the Switch, an example of the instruction field is as follows:
Outer MAC SA→a MAC address of a tunnel endpoint of the Switch;
Outer MAC DA→a MAC address of a tunnel endpoint of the external network device;

Outer IP SA→an IP address of the tunnel endpoint of the Switch;

Outer IP DA→an IP address of the tunnel endpoint of the external network device;

Encap Tunnel ID A (performing encapsulation, where a tunnel identifier is Tunnel ID A); and Output→port6 (an output port is port 6).

In the case in which the external network device cannot perform MAC layer communication with the Switch, after the Switch processes traffic flow a according to forwarding rule 3 of service chain a, a data packet in the traffic flow is in a format shown in FIG. 7.

Forwarding rule 1 of service chain b (flow table entry 1 of service chain b):

Match field: Tunnel ID B and Ingress Port1; and

Instruction field: decapsulating a data packet in the traffic flow, removing Tunnel ID B, and sending the decapsulated data packet to SE1 through port 4.

An example of the Instruction field is as follows:

Decap Tunnel ID B (performing outer tunnel decapsulation on the data packet);

Inner MAC DA→SE1 MAC (changing an inner destination MAC address of the data packet into a MAC address of SE1); and Output→port4 (an output port is port 4).

Forwarding rule 2 of service chain b (flow table entry 2 of service chain b):

Match field: Tunnel ID B and Ingress Port2; and

Instruction field: decapsulating a data packet in the traffic flow, removing Tunnel ID B, and sending the decapsulated data packet to an external network device through port 6.

Examples of the Instruction field are as follows:

In the case in which the external network device can perform MAC layer communication with the Switch, an example of the instruction field is as follows:

Decap Tunnel ID B (performing outer tunnel decapsulation on the data packet);

Inner MAC DA→external network device MAC (changing an inner destination MAC address of the data packet into a MAC address of the external network device); and Output→port6 (an output port is port 6).

In the case in which the external network device cannot perform MAC layer communication with the Switch, an example of the instruction field is as follows:

Outer MAC SA→a MAC address of a tunnel endpoint of the Switch;

Outer MAC DA→a MAC address of a tunnel endpoint of the external network device;

Outer IP SA→an IP address of the tunnel endpoint of the Switch;

Outer IP DA→an IP address of the tunnel endpoint of the external network device;

Encap Tunnel ID B (performing encapsulation, where a tunnel identifier is Tunnel ID B); and Output→port6 (an output port is port 6).

It should be noted that in the three forwarding rules of service chain a and the two forwarding rules of service chain b, Ingress Port n (n is 1, 2, or 3) in the match field is used for identifying a place from which the traffic flow enters the Switch, where Ingress Port2 and Ingress Port3 indicate that the traffic flow flows from SE1 and SE2 to the Switch. The solution of the embodiment of the present invention does not limit the information for identifying an SE from which a traffic flow comes, such as a MAC address of the SE, a source MAC address of the traffic flow, or a VLAN tag of the traffic flow.

The Switch saves three flow table entries corresponding to the three forwarding rules of service chain a; and the Switch saves two flow table entries corresponding to the two forwarding rules of service chain b.

The second step: When the arriving data packet includes a tunnel identifier, the Switch searches, by using the tunnel identifier in the data packet and an input port number as search conditions, the flow table entries of the service chains saved by the Switch in the first step, and after establishing a correspondence between information about a traffic flow and the tunnel identifier, routes, according to content in an instruction field of a flow table entry found after searching, the decapsulated data packet whose tunnel identifier is removed.

For example, after traffic flow a arrives at the Switch, the Switch searches the match fields of the flow table entries according to Ingress Port1 and Tunnel ID A in a data packet of traffic flow a, to find flow table entry 1 of service chain a. It should be noted that the Switch may store Ingress port information in the data packet as auxiliary information for describing the data packet, and may directly obtain the Ingress port information about the data packet when needed.

According to the description of the Instruction field in flow table entry 1 of service chain a, the Switch decapsulates the data packet in traffic flow a and removes Tunnel ID A, generates and saves a correspondence between information about traffic flow a and Tunnel ID A before sending decapsulated traffic flow a to SE1, and then sends, to SE1, decapsulated traffic flow a whose Tunnel ID A is removed. It should be noted that in the solution of the embodiment of the present invention, the Switch may first perform the operation of decapsulating traffic flow a and removing Tunnel ID A, and then perform the operation of establishing the correspondence; or may also first establish the correspondence, and then perform the operation of decapsulating traffic flow a and removing Tunnel ID A.

Assuming that an identifier of traffic flow a in the solution of this embodiment is a quintuple, a specific method for establishing the correspondence by the Switch includes but is not limited to the following two manners:

Manner 1:

A new flow table entry corresponding to the quintuple of traffic flow a is generated, where Match Field: the quintuple of traffic flow a; and Instruction field: performing tunnel encapsulation on the data packet in traffic flow a, where a tunnel identifier is Tunnel ID A.

An example of Match Field is as follows:

Ingress port=port n (n may be 2 or 3);

Inner IP DA=192.168.0.1 (the IP address and the UDP information that are involved herein are exemplary);

Inner IP SA=192.168. 1.1;

Inner UDP DA=8080;

Inner UDP SA=8088; and

Protocol type=TCP.

An example of the Instruction field is as follows:

Encap Tunnel ID A (performing encapsulation, where a tunnel identifier is Tunnel ID A); and go to Table n (invoking flow table entry n of service chain a, where n is 2 or 3).

The Table n is an index of the flow table entries generated by the Switch in the first step.

Manner 2:

The Switch generates a setting table, such as a chain table or a Hash table, and the Switch inserts the quintuple of traffic flow a and Tunnel ID A as elements into the setting table. Because the correspondence between the quintuple of traffic flow a and Tunnel ID A is already recorded in the setting table, the Switch only needs to generate a flow table entry used for processing a traffic flow sent back by an SE.

For example, the Switch generates a flow table entry, where

Match field:
Ingress port=port 2; or
Ingress port=port 2, and
Inner MAC SA=00:11:22:33:44:55;
note: the content in the match field is information for identifying that the traffic flow comes from an SE, such as a number of a port through which the traffic flow enters the Switch, a source MAC address of the data packet, or a VLAN tag in the data packet; and Instruction field:
Encap Tunnel IDA (searching the setting table according to the quintuple of traffic flow a, to obtain corresponding Tunnel ID A, and encapsulating the data packet in traffic flow a, where a tunnel identifier is Tunnel ID A); or saving Tunnel ID A as auxiliary information about the data packet (for example, in an OpenFlow protocol, saving Tunnel ID A in the form of metadata), and delivering Tunnel ID A in the auxiliary information to Table n in a next step; and go to Table n (invoking flow table entry n of service chain a, where n is 2 or 3).

In this step, the Instruction field instructs the Switch to perform tunnel encapsulation again on traffic flow a and traffic flow b which are sent from the SE to the Switch. Such an Instruction field is just an expression form for identifying a correspondence between information about a traffic flow and information about a service chain, and there may be another manner which can be used for recording the correspondence between the information about the traffic flow and the information about the service chain; for example, information about a service chain corresponding to a traffic flow is stored, in the Instruction field, as auxiliary information about a data packet of the traffic flow; for example, in an OpenFlow protocol, a switch stores, in metadata, the information about the service chain corresponding to the traffic flow. In this embodiment, the manner of recording the correspondence between the information about the traffic flow and the information about the service chain in the Instruction field is not limited.

The foregoing describes processing for traffic flow a, and processing for traffic flow b is the same, so details are not described herein again.

The third step: When the arriving data packet in the traffic flow does not include the tunnel identifier (that is, the data packet is received from an SE), the Switch extracts information about the traffic flow from the data packet, determines a corresponding tunnel identifier according to the established correspondence, and after finding a flow table entry by searching according to the tunnel identifier, performs routing according to an instruction field in the flow table entry.

Using a process of routing traffic flow a as an example, in the second step, the Switch processes traffic flow a according to flow table entry 1 of service chain a, that is, after saving the correspondence between the quintuple of traffic flow a and Tunnel ID A, the Switch sends, to SE1, decapsulated traffic flow a whose Tunnel ID A is removed. After processing traffic flow a, SE1 sends traffic flow a back to the Switch. After searching out corresponding Tunnel ID A according to the quintuple of received traffic flow a, the Switch processes traffic flow a.

If the Switch establishes the correspondence between the quintuple of traffic flow a and Tunnel ID A in manner 1 in the second step, a specific implementation manner of this step is as follows:

The Switch searches, by using the quintuple of traffic flow a as a search condition, the flow table entries generated in manner 1 of the second step, to find a flow table entry of which the content in a match field is the quintuple of traffic flow a.

The Switch performs an operation on traffic flow a according to an Instruction field in the flow table entry found after searching, that is, encapsulates the data packet in traffic flow a, where a tunnel identifier is Tunnel ID A.

After encapsulating traffic flow a, the Switch searches the flow table entries of service chain a in the first step by using Tunnel ID A in the data packet and Ingress port2 as search conditions, and finds flow table entry 2 of service chain a in this case.

The Switch invokes flow table entry 2 of service chain a, and performs an operation on traffic flow a according to the Instruction field in flow table entry 2 of service chain a, that is, decapsulates traffic flow a, removes Tunnel ID A, and sends processed traffic flow a to SE2.

If the Switch establishes the correspondence between the quintuple of traffic flow a and Tunnel ID A in manner 2 in the second step, a specific implementation manner of this step is as follows:

After searching out, by using the input port number of traffic flow a as a search condition, the flow table entry generated by the Switch in manner 2, the Switch searches the setting table in manner 2 in the second step according to the Instruction field in the flow table entry searched out and by using the quintuple of traffic flow a as a search condition, to find corresponding Tunnel ID A.

The Switch searches the flow table entries of service chain a in the first step by using the found Tunnel ID A in the data packet and Ingress port2 as search conditions, to find flow table entry 2 of service chain a in this case.

The Switch invokes flow table entry 2 of service chain a, and performs an operation on traffic flow a according to the Instruction in flow table entry 2 of service chain a, that is, sends traffic flow a to SE2.

Similarly, for traffic flow a sent from SE2 back to the Switch, the Switch routes traffic flow a in the same manner, and details are not described herein again.

Similarly, for traffic flow b, the Switch routes traffic flow b in the same manner, and the details are not described herein again.

If in the second step, the correspondence between the information about the traffic flow and the information about the service chain is recorded in the Instruction field not in the manner of encapsulating the tunnel identifier into the data packet of the traffic flow but in the manner of storing the information (for example, the tunnel identifier) about the service chain corresponding to the traffic flow as auxiliary information about the data packet of the traffic flow, in the third step, the Switch does not need to perform tunnel encapsulation on the data packet of the traffic flow, but directly searches for a flow table entry by using the information (for example, the tunnel identifier) about the service chain stored in the auxiliary information about the data packet of the traffic flow as a match field, and then forwards the data packet according to a forwarding rule in an instruction field of the obtained flow table entry.

Embodiment 4

A solution in Embodiment 4 of the present invention is basically the same as that in Embodiment 3, and a difference lies in that a correspondence established by a Switch is a correspondence between information about a traffic flow and a forwarding rule of a service chain. Still using the routing of the two traffic flows corresponding to different service chains shown in FIG. 6 as an example, the solution in Embodiment 4 is described as follows:

The first step: An SPC delivers forwarding rules a of service chain a and forwarding rules b of service chain b to the Switch through a programmable interface.

Using forwarding rules which are corresponding to service chain a and delivered by the SPC to the Switch as an example, the Switch saves the forwarding rules of service chain a in the form of a flow table entry.

Forwarding rule 1 of service chain a (flow table entry 1 of service chain a):

Match field: Tunnel ID A and Ingress Port1; and

Instruction field: obtaining a quintuple of a traffic flow, and invoking flow table entry 2 after generating the following forwarding rule for the quintuple.

An example of the Instruction field is as follows:

1) generating a forwarding rule:

Match field:

Ingress port=port 2;

Inner IP DA=192.168.0.1;

Inner IP SA=192.168. 1.1;

Inner UDP DA=8080;

Inner UDP SA=8088; and

Protocol type=TCP; and

Instruction field:

Inner Dst MAC→Enabler2 Dst MAC (changing an inner destination MAC address of a data packet into a MAC address of SE2); and Output→port5 (an output port is port 5); and 2) invoking flow table entry 2

Go to Table2.

Forwarding rule 2 of service chain a (flow table entry 2 of service chain a):

Match field: Tunnel ID A; and

Instruction field: obtaining a quintuple of a traffic flow, and invoking flow table entry 3 after generating the following forwarding rule for the quintuple.

An example of the Instruction field is as follows:

1) generating a forwarding rule:

Match field:

Ingress port=port 3;

Inner IP DA=192.168.0.1;

Inner IP SA=192.168. 1.1;

Inner UDP DA=8080;

Inner UDP SA=8088; and

Protocol type=TCP; and

Instruction field:

sending a traffic flow to an external network device, where the external network device may be an external network device which can perform MAC layer communication with the Switch, or an external network device which cannot perform MAC layer communication with the Switch. According to the foregoing two cases, specific examples of the Instruction field are as follows:

In a case in which the external network device can perform MAC layer communication with the Switch, an example of the instruction field is as follows:

Decap Tunnel ID A (performing decapsulation, and removing Tunnel ID A);

Inner Dst MAC→external network device Dst MAC (changing an inner destination MAC address of a data packet into a MAC address of the external network device); and Output→port6 (an output port is port 6); and in the case in which the external network device cannot perform MAC layer communication with the Switch, an example of the instruction field is as follows:

Outer Src MAC→a MAC address of a tunnel endpoint of the Switch;

Outer Dst MAC→a MAC address of a tunnel endpoint of the external network device;

Outer Src IP→an IP address of the tunnel endpoint of the Switch;

Outer Dst IP→an IP address of the tunnel endpoint of the external network device;

Encap Tunnel ID A (performing encapsulation, where a tunnel identifier is Tunnel ID A); and Output→port6 (an output port is port 6);

2) invoking flow table entry 3

Go to Table3.

Forwarding rule 3 of service chain a (flow table entry 3 of service chain a):

Match Field: Tunnel ID A; and

Instruction field: after decapsulating the traffic flow and removing Tunnel ID A, sending the processed traffic flow to SE1.

An example of the Instruction field is as follows:

Decap Tunnel ID A (performing decapsulation, and removing Tunnel ID A);

Inner Dst MAC→SE1 Dst MAC (changing an inner destination MAC address of a data packet into a MAC address of SE1); and Output→port4 (an output port is port 4).

Using forwarding rules which are corresponding to service chain b and delivered by the SPC to the Switch as an example, the Switch saves the forwarding rules of service chain b in the form of a flow table entry.

Forwarding rule 1 of service chain b (flow table entry 1 of service chain b):

Match Field: Tunnel ID B and Ingress Port1; and

Instruction field: obtaining a quintuple of a traffic flow, and invoking flow table entry 2 after generating the following forwarding rule for the quintuple. An example of the Instruction field is as follows:

1) generating a forwarding rule:

Match field:

Ingress port=port 2;

Inner IP DA=192.168.0.1;

Inner IP SA=192.168. 1.1;

Inner UDP DA=8080;

Inner UDP SA=8088; and

Protocol type=TCP; and

Instruction field:

sending a traffic flow to an external network device, where the external network device may be an external network device which can perform MAC layer communication with the Switch, or an external network device which cannot perform MAC layer communication with the Switch. According to the foregoing two cases, specific examples of the Instruction field are as follows:

In the case in which the external network device can perform MAC layer communication with the Switch, an example of the instruction field is as follows:

Decap Tunnel ID B (performing decapsulation, and removing Tunnel ID B);

Inner Dst MAC→external network device Dst MAC (changing an inner destination MAC address of a data packet into a MAC address of the external network device); and Output→port6 (an output port is port 6); and in the case in which the external network device cannot perform MAC layer communication with the Switch, an example of the instruction field is as follows:

Outer Src MAC→a MAC address of a tunnel endpoint of the Switch;

Outer Dst MAC→a MAC address of a tunnel endpoint of the external network device;

Outer Src IP→an IP address of the tunnel endpoint of the Switch;

Outer Dst IP→an IP address of the tunnel endpoint of the external network device;

Encap Tunnel ID B (performing encapsulation, where a tunnel identifier is Tunnel ID B); and Output→port6 (an output port is port 6);

2) invoking flow table entry 2

Go to Table2.

Forwarding rule 2 of service chain b (flow table entry 2 of service chain b):

Match Field: Tunnel ID B; and

Instruction field: after decapsulating the traffic flow and removing Tunnel ID B, sending the processed traffic flow to SE1.

An example of the Instruction field is as follows:

Decap Tunnel ID B (performing decapsulation, and removing Tunnel ID B);

Inner Dst MAC→SE1 Dst MAC (changing an inner destination MAC address of a data packet into a MAC address of SE1); and Output→port4 (an output port is port 4).

The second step: When the arriving data packet includes a tunnel identifier, the Switch searches, by using the tunnel identifier in the data packet and an input port number as search conditions, the flow table entries saved by the Switch in the first step, and after establishing a correspondence between information about a traffic flow and a forwarding rule of a service chain, routes, according to an Instruction field in a flow table entry found after searching, the decapsulated data packet whose tunnel identifier is removed.

For example, after traffic flow a arrives at the Switch, the Switch searches, by using Tunnel ID A in a data packet of traffic flow a and Ingress Port1 as search conditions, the match fields of the flow table entries saved by the Switch in the first step, and finds flow table entry 1 of service chain a in this case.

According to the description of the Instruction field in flow table entry 1 of service chain a, the Switch decapsulates the data packet in traffic flow a and removes Tunnel ID A, generates and saves a correspondence between an identifier of traffic flow a and a forwarding rule of service chain a before sending decapsulated traffic flow a to SE1, and then sends, to SE1, decapsulated traffic flow a whose Tunnel ID A is removed.

Assuming that the information about traffic flow a in the solution of this embodiment is a quintuple, a specific method for establishing the correspondence by the Switch includes but is not limited to the following two manners:

The Switch generates a flow table entry for the quintuple of traffic flow a and the forwarding rule of service chain a, where Match field: the quintuple of traffic flow a; and Instruction field: sending the data packet of traffic flow a to SE2.

An example of the Match field is as follows:

Ingress port=port2;

Inner IP DA=192.168.0.1;

Inner IP SA=192.168. 1.1;

Inner UDP DA=8080;

Inner UDP SA=8088; and

Protocol type=TCP.

An example of the Instruction field is as follows:

Inner Dst MAC→Enabler2 Dst MAC (changing an inner destination MAC address of a data packet into a MAC address of SE2); and Output→port5 (an output port is port 5).

The foregoing describes the flow table entry of traffic flow a sent by SE1 back to the Switch, whose content is similar to that of a flow table entry of traffic flow a sent by SE2 back to the Switch, and a difference lies in that the data packet of traffic flow a is sent to an external network device through port 6.

The third step: When the arriving data packet does not include a tunnel identifier (that is, a data packet sent back by an SE), the Switch extracts information about a traffic flow from the data packet, determines a forwarding rule of a corresponding service chain according to the established correspondence, and routes the data packet according to the forwarding rule.

Using a process of routing traffic flow a as an example, after saving the correspondence between the quintuple of traffic flow a and the forwarding rule of service chain a in the second step, the Switch sends, to SE1, decapsulated traffic flow a whose Tunnel ID A is removed. After processing traffic flow a, SE1 sends traffic flow a back to the Switch. A corresponding forwarding rule of service chain a that is found by the Switch according to the quintuple of received traffic flow a is as follows: sending a data packet of traffic flow a to SE2, that is, sending the data packet of traffic flow a to SE2 through port 5.

A manner of routing traffic flow a sent by SE2 back to the Switch is similar to the foregoing manner, and a manner of processing traffic flow b is the same as the manner of processing traffic flow a, so details are not described herein again.

Embodiment 5

In a solution in Embodiment 5 of the present invention, a Switch establishes a correspondence between information about a traffic flow and a forwarding rule of a service chain according to a template, included in a forwarding rule delivered by an SPC, of a correspondence between information about a traffic flow and a forwarding rule of a service chain. Still using a process of routing traffic flow a and traffic flow b shown in FIG. 6 as an example, the solution in Embodiment 5 is specifically described as follows:

The first step: An SPC delivers forwarding rules a of service chain a and forwarding rules b of service chain b to the Switch through a programmable interface.

Forwarding rules of service chain a describe processing manners used when traffic flow a is input through port 1, port 2, and port 3; and forwarding rules of service chain b describe processing manners used when traffic flow b is input through port 1 and port 2. Specific content is described as follows:

Forwarding rules of service chain a (flow table entries of service chain a):

Match Field: Tunnel ID A and Ingress Port1; and Instruction:

1) generating flow table entry 1 (that is, creating a correspondence template):

Match Field: a quintuple of a traffic flow and Ingress Port2; and

Instruction field: sending a data packet of the traffic flow to SE2;

2) generating flow table entry 2:

Match Field: a quintuple of the traffic flow and Ingress Port3; and

Instruction field: sending a data packet of the traffic flow to an external network device; and 3) performing tunnel decapsulation on the traffic flow, removing Tunnel ID A, and sending a data packet of decapsulated traffic flow a to SE1.

Forwarding rules of service chain b (flow table entries of service chain b):

Match Field: Tunnel ID B and Ingress Port1; and

Instruction:

1) generating flow table entry 1:

Match Field: a quintuple of a traffic flow and Ingress Port2; and

Instruction field: sending a data packet of the traffic flow to an external network device; and 2) performing tunnel decapsulation on the traffic flow, removing Tunnel ID B, and sending a data packet of decapsulated traffic flow b to SE1.

The second step: When the arriving data packet includes a tunnel identifier, the Switch searches, by using the tunnel identifier in the data packet and an input port number as search conditions, the flow table entries of the service chains saved by the Switch in the first step, and after establishing a correspondence between information about a traffic flow and a forwarding rule of a service chain according to a template described in an Instruction in a flow table entry found after searching, routes, according to the Instruction in the flow table entry found after searching, the decapsulated data packet whose tunnel identifier is removed.

For example, after traffic flow a arrives at the Switch, the Switch searches for a flow table entry of service chain a according to Tunnel ID A in a data packet of traffic flow a and Ingress Port1. Then, the Switch generates two flow table entries according to a template described in an Instruction in the flow table entry of service chain a, where flow table entry 1 and flow table entry 2 are defined as follows:

Flow table entry 1:

Match Field: a quintuple of traffic flow a and Ingress Port2; and

Instruction field: sending the data packet of traffic flow a to SE2.

Flow table entry 2:

Match Field: a quintuple of traffic flow a and Ingress Port3; and

Instruction field: sending the data packet of traffic flow a to an external network device.

After generating the two flow table entries, the Switch sends, to SE1, decapsulated traffic flow a whose Tunnel ID A is removed according to the description in the Instruction in the flow table entry of service chain a.

Similarly, for traffic flow b, the manner same as that for traffic flow a is used; and after generating one flow table entry of traffic flow b, the Switch sends, to SE1, decapsulated traffic flow b whose Tunnel ID B is removed.

The third step: When the arriving data packet does not include a tunnel identifier (that is, a data packet from an SE), the Switch extracts information about a traffic flow from the data packet, searches for a flow table entry by using the information about the traffic flow as a search condition, and routes the data packet according to description of an Instruction field in the flow table entry.

Using a process of routing traffic flow a as an example, the Switch generates flow table entry 1 and flow table entry 2 for the quintuple of traffic flow a in the second step, and sends, to SE1, decapsulated traffic flow a whose Tunnel ID A is removed. After processing traffic flow a, SE1 sends traffic flow a back to the Switch. The Switch searches for flow table entry 1 according to the quintuple of received traffic flow a and Ingress Port2, and sends the data packet of traffic flow a to SE2 according to the description of the Instruction field in flow table entry 1.

A manner of routing traffic flow a sent by SE2 back to the Switch is similar to the foregoing manner, and a manner of processing traffic flow b is the same as the manner of processing traffic flow a, so details are not described herein again.

In the solution of Embodiment 5 of the present invention, a corresponding flow table entry is generated for each routing process, and when a Switch routes a traffic flow according to content of the flow table entry, routing path finding time can be shortened, and routing efficiency can be improved.

Embodiment 6

Embodiment 6 further describes another manner of establishing and saving the correspondence by a Switch. A logic module is deployed in the Switch, and the logic module establishes and saves the correspondence between information about a traffic flow and information about a service chain, or, the correspondence between information about a traffic flow and a forwarding rule of a service chain, which is referred to as a correspondence in the following. The logic module has logic ports, where the logic ports are used for receiving a data packet which is processed according to a flow table entry saved in the Switch, and then handing over the processed data packet to another flow table entry saved in the Switch for processing.

Figure 9:
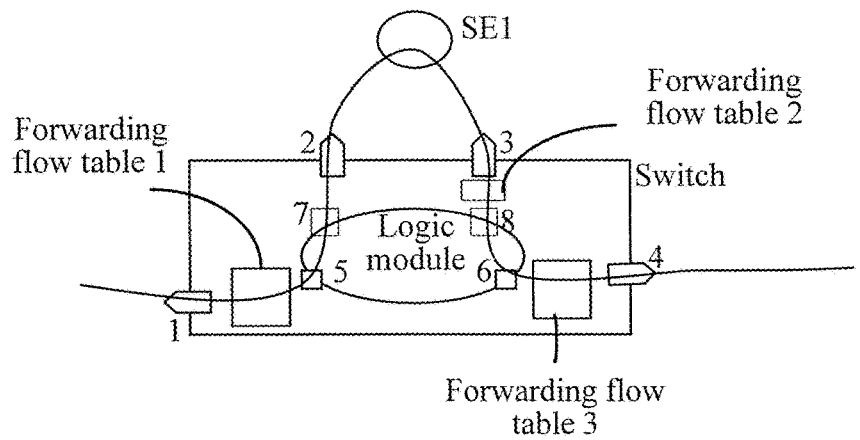
FIG. 9 is a schematic diagram of a Switch deployed with a logic module according to Embodiment 6 of the present invention.

FIG. 9 is a schematic diagram of a Switch deployed with a logic module. Port 1, port 2, port 3, and port 4 are input/output ports on the Switch, and port 5, port 6, port 7, and port 8 are logic ports on the logic module. The number of logic ports of the logic module is not limited in this embodiment.

The first step: The Switch receives forwarding rules of a service chain delivered by an SPC.

Using the case shown in FIG. 9 as an example, the forwarding rules received by the Switch includes:

Forwarding rule 1 of service chain b (flow table entry 1 of service chain b) in the Switch:

Match Field: Tunnel ID B and Ingress Port1; and

Instruction field: performing tunnel decapsulation on a traffic flow, removing Tunnel ID B, and sending a data packet of a decapsulated traffic flow to the logic module through logic port 5. An example of the Instruction field is as follows:

Decap Tunnel ID B (performing decapsulation, and removing Tunnel ID B of the traffic flow);

(optional) Inner MAC DA→Enabler1 MAC (changing an inner destination MAC address of the data packet into a MAC address of SE1); and Output→port5 (an output port is logic port 5).

Forwarding rule 2 of service chain b (flow table entry 2 of service chain b) in the Switch:
Match Field: Ingress Port3; and
Instruction field: sending a data packet of a traffic flow to the logic module through logic port 8.
An example of the Instruction field is as follows:
Output→port8.
Forwarding rule 3 of service chain b (flow table entry 3 of service chain b) in the Switch:
Match Field: Tunnel ID B and Ingress Port6; and
Instruction field: sending a data packet of a traffic flow to an external network device through port 4.
Examples of the Instruction field are as follows:
In the case in which the external network device can perform MAC layer communication with the Switch, an example of the instruction field is:
Inner Dst MAC→external network device Dst MAC (changing an inner destination MAC address of a data packet into a MAC address of the external network device); and
Output→port4.
In the case in which the external network device cannot perform MAC layer communication with the Switch, an example of the instruction field is:
Outer Src MAC→a MAC address of a tunnel endpoint of the Switch;
Outer Dst MAC→a MAC address of a tunnel endpoint of the external network device;
Outer Src IP→an IP address of the tunnel endpoint of the Switch;
Outer Dst IP→an IP address of the tunnel endpoint of the external network device;
Encap Tunnel ID B (performing encapsulation, where a tunnel identifier is Tunnel ID B); and
Output→port4.
The second step: When the arriving data packet includes a tunnel identifier, the Switch searches, by using the tunnel identifier in the data packet and an input port number as search conditions, the flow table entries of the service chains saved by the Switch in the first step, and sends a traffic flow to the logic module according to description of an Instruction field in a flow table entry found after searching; and after establishing a correspondence, the logic module routes, according to a routing path in configuration information stored in the logic module, the decapsulated data packet whose tunnel identifier is removed.

For example, after traffic flow b arrives at the Switch, the Switch searches for flow table entry 1 of service chain b according to Tunnel ID B in the data packet of traffic flow b and Ingress Port1. Then, the Switch sends traffic flow b to the logic module according to the description of the Instruction field in flow table entry 1 of service chain b.

After receiving traffic flow b, the logic module establishes and saves a correspondence between information about traffic flow b and a forwarding rule of service chain b (or establishes and saves a correspondence between information about traffic flow b and information about service chain b), and in the solution of this embodiment, the logic module may establish the correspondence in any one of the manners described in Embodiment 3 to Embodiment 5.

After saving the correspondence, the logic module may route traffic flow b according to a routing path of service chain b that is recorded in locally stored configuration information. In the solution of this embodiment, a forwarding rule of a service chain may be configured inside the logic module in a manner of configuring information, so that the logic module can route decapsulated traffic flow b whose Tunnel ID B is removed.

For example, a routing path of service chain b (a tunnel identifier or a service identifier of service chain b may be used as a search index) recorded in the configuration information is as follows:
1: receiving a data packet of traffic flow b (in this case, the data packet or auxiliary information (for example, metadata) of the data packet includes the tunnel identifier or the service identifier of service chain b);
2: sending traffic flow b to SE1 through port 2;
3: receiving, through port 3, traffic flow b which is processed by SE1; and
4: sending traffic flow b to an external network device.

The logic module may send, to SE1 according to the locally configured routing path, decapsulated traffic flow b whose Tunnel ID B is removed.

Optionally, the Switch may perform the operation of decapsulating traffic flow b, removing Tunnel ID B of traffic flow b, and changing an inner destination MAC address of the data packet into a MAC address of SE1; or if information about SE1 is configured in the logic module, the logic module may also perform the foregoing operation.

The third step: When the arriving data packet does not include a tunnel identifier, the Switch searches the flow table entries of the service chains for a matching flow table entry by using an input port number as a search condition, and sends a traffic flow to the logic module; after extracting information about the traffic flow, the logic module determines information about a service chain or a forwarding rule of a corresponding service chain according to the locally stored correspondence, and sends a notification to the Switch; and the Switch routes the data packet according to the notification from the logic module.

Assuming that the logic module saves a correspondence between a quintuple of traffic flow b and Tunnel ID B in the second step, in the third step, after determining corresponding Tunnel ID B according to the quintuple of traffic flow b, the logic module may save Tunnel ID B as auxiliary information about the data packet of traffic flow b, and save the auxiliary information in flow table entry 3 of service chain b, so as to send the notification to the Switch. For example, in an OpenFlow protocol, the logic module may store Tunnel ID B in metadata, and deliver the metadata to flow table entry 3 of service chain b.

The Switch searches the flow table entries of service chain b generated in the first step for flow table entry 3 of service chain b by using Tunnel ID B delivered by the logic module and an input port as search conditions, and sends traffic flow b to an external network device according to the description of the Instruction field in flow table entry 3 of service chain b.

Embodiment 7

Figure 10A:
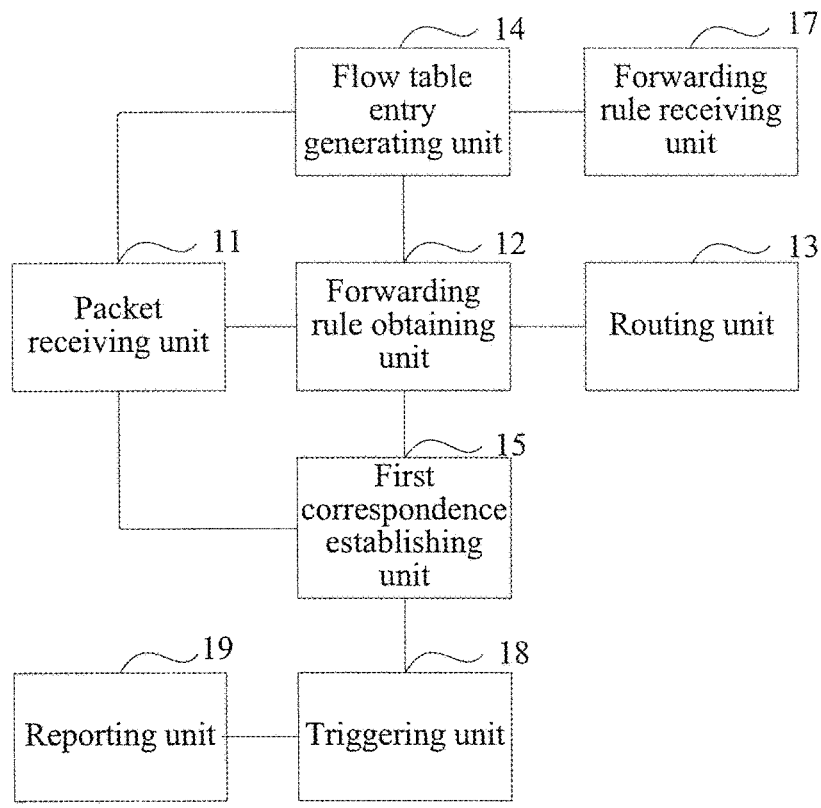
FIG. 10(a) and FIG. 10(b) are schematic structural diagrams of a data packet routing device according to Embodiment 7 of the present invention.
Figure 10B:
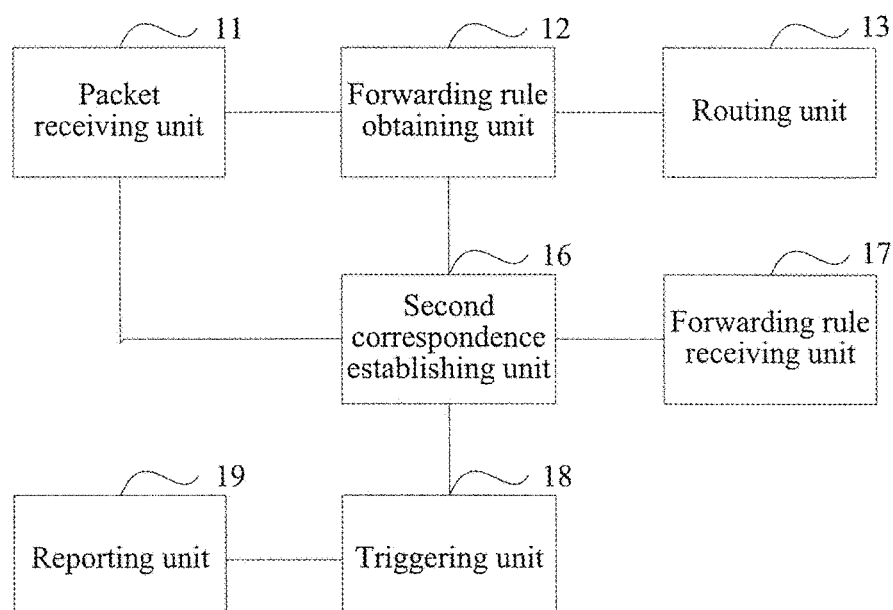

Embodiment 7 of the present invention further describes a data packet routing device having the inventive concept same as that of Embodiment 1 to Embodiment 6. As shown in FIG. 10(*a*) and FIG. 10(*b*), the data packet routing device includes a packet receiving unit 11, a forwarding rule obtaining unit 12, and a routing unit 13, where the packet receiving unit 11 is configured to receive a data packet sent by an SE;

the forwarding rule obtaining unit 12 is configured to obtain, according to a traffic flow which the data packet received from the SE belongs to, a forwarding rule of a service chain corresponding to the traffic flow; and the routing unit 13 is configured to route, according to the forwarding rule, the data packet received from the SE.

Specifically, a manner of obtaining the forwarding rule of the service chain by the forwarding rule obtaining unit includes but is not limited to the following two manners, which are described separately in the following:

Manner 1 is shown in FIG. 10(*a*):

The forwarding rule obtaining unit 12 is specifically configured to obtain the forwarding rule of the service chain according to the traffic flow which the data packet received from the SE belongs to and a correspondence between the traffic flow and the service chain.

The data packet routing device further includes:

a flow table entry generating unit 14, configured to generate a flow table entry according to the forwarding rule, where a match field of the flow table entry includes information about the service chain, and an instruction field of the flow table entry includes the forwarding rule; and the forwarding rule obtaining unit 12 is specifically configured to encapsulate, according to the traffic flow which the data packet received from the SE belongs to and the correspondence between the traffic flow and the service chain, the data packet received from the SE, so that the encapsulated data packet includes the information about the service chain, and obtain, according to the encapsulated data packet, information in the instruction field of the corresponding flow table entry generated by the flow table entry generating unit 14; or obtain the information about the service chain according to the traffic flow which the data packet received from the SE belongs to and the correspondence between the traffic flow and the service chain, and obtain, according to the obtained information about the service chain, information in the instruction field of the corresponding flow table entry generated by the flow table entry generating unit 14.

The data packet routing device further includes a first correspondence establishing unit 15, configured to establish the correspondence between the traffic flow and the service chain according to information about the traffic flow and information about the service chain that are included in a received data packet.

The packet receiving unit 11 is further configured to receive a data packet sent by a network device, where the data packet sent by the network device includes the information about the traffic flow and the information about the service chain; and the first correspondence establishing unit 15 is specifically configured to establish the correspondence between the traffic flow and the service chain according to the information about the traffic flow and the information about the service chain that are included in the data packet received by the packet receiving unit.

Manner 2 is shown in FIG. 10(*b*):

The forwarding rule obtaining unit 12 is specifically configured to obtain the forwarding rule of the service chain according to the traffic flow which the data packet received from the SE belongs to and a correspondence between the traffic flow and the forwarding rule of the service chain.

The data packet routing device further includes a second correspondence establishing unit 16, configured to establish the correspondence between the traffic flow and the forwarding rule of the service chain according to information about the traffic flow and information about the service chain that are included in a received data packet.

The packet receiving unit 11 is further configured to receive a data packet sent by a network device, where the data packet sent by the network device includes the information about the traffic flow and the information about the service chain; and the second correspondence establishing unit 16 is specifically configured to establish the correspondence between the traffic flow and the forwarding rule of the service chain according to the information about the traffic flow and the information about the service chain in the data packet received by the packet receiving unit 11 and a correspondence between the service chain and the forwarding rule of the service chain.

The second correspondence establishing unit 16 is specifically configured to generate a flow table entry according to the information about the traffic flow and the information about the service chain in the data packet received by the packet receiving unit 11 and the correspondence between the service chain and the forwarding rule of the service chain, where a match field of the flow table entry includes the information about the traffic flow, and the instruction field includes the forwarding rule.

The forwarding rule obtaining unit 12 is specifically configured to obtain information in the instruction field of the corresponding flow table entry according to the traffic flow which the data packet received from the SE belongs to.

In addition, the data packet routing device further includes a forwarding rule receiving unit 17, configured to receive the forwarding rule of the service chain delivered by an SPC.

The data packet routing device further includes a triggering unit 18, configured to trigger the first correspondence establishing unit 15 or the second correspondence establishing unit 16 when instruction information delivered by the SPC is received, where the instruction information is used for instructing the Switch to establish the correspondence, or when it is determined according to configuration information that the correspondence is to be established.

The data packet routing device further include a reporting unit 19, configured to report, to the SPC, that the device has a capability of establishing the correspondence. Certainly, the SPC may determine, according to local configuration information, whether the data packet routing device has the capability of establishing the correspondence.

Embodiment 8

Figure 11:
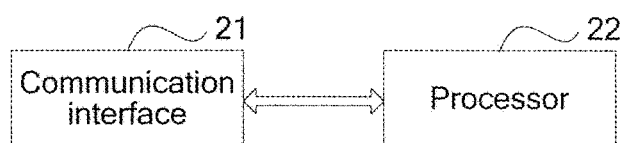
FIG. 11 is a schematic structural diagram of a data packet routing device according Embodiment 8 of the present invention.

Embodiment 8 of the present invention further describes a data packet routing device having the inventive concept same as that of Embodiment 1 to Embodiment 6. As shown in FIG. 11, the data packet routing device includes a communication interface 21 and a processor 22, where the communication interface 21 is configured to interact with an external network device; and the processor 22 is configured to receive, through the communication interface 21, a data packet sent by an SE, obtain, according to a traffic flow which the data packet received from the SE belongs to, a forwarding rule of a service chain corresponding to the traffic flow, and route, according to the forwarding rule, the data packet received from the SE.

Specifically, a manner of obtaining the forwarding rule of the service chain by the processor 22 includes but is not limited to the following two manners, which are described separately in the following:

Manner 1:

The processor 22 may obtain the forwarding rule of the service chain according to the traffic flow which the data packet received from the SE belongs to and a correspondence between the traffic flow and the service chain.

As an optional implementation manner, the processor 22 is configured to generate a flow table entry according to the forwarding rule, where a match field of the flow table entry includes information about the service chain, and an instruction field of the flow table entry includes the forwarding rule; and in this case, the obtaining, by the processor 22, the forwarding rule of the service chain according to the traffic flow which the data packet received from the SE belongs to and a correspondence between the traffic flow and the service chain includes: encapsulating, by the processor 22, according to the traffic flow which the data packet received from the SE through the communication interface 21 belongs to and the correspondence between the traffic flow and the service chain, the data packet received from the SE, so that an encapsulated data packet includes the information about the service chain, and obtaining information in the instruction field of the corresponding flow table entry according to the encapsulated data packet; or obtaining the information about the service chain according to the traffic flow which the data packet received from the SE through the communication interface 21 belongs to and the correspondence between the traffic flow and the service chain, and obtaining information in the instruction field of the corresponding flow table entry according to the obtained information about the service chain.

The processor 22 may also establish the correspondence between the traffic flow and the service chain according to information about the traffic flow and information about the service chain that are included in a received data packet.

Specifically, the processor 22 is further configured to receive, through the communication interface 21, a data packet sent by a network device, where the data packet sent by the network device includes the information about the traffic flow and the information about the service chain; and establish the correspondence between the traffic flow and the service chain according to the information about the traffic flow and the information about the service chain that are included in the data packet received through the communication interface 21.

Manner 2:

The processor 22 may obtain the forwarding rule of the service chain according to the traffic flow which the data packet received from the SE belongs to and a correspondence between the traffic flow and the forwarding rule of the service chain.

Exemplarily, the processor 22 is configured to establish the correspondence between the traffic flow and the forwarding rule of the service chain according to information about the traffic flow and information about the service chain that are included in a received data packet.

Specifically, the processor 22 receives, through the communication interface 21, a data packet sent by a network device, where the data packet sent by the network device includes the information about the traffic flow and the information about the service chain; and establishes the correspondence between the traffic flow and the forwarding rule of the service chain according to the information about the traffic flow and the information about the service chain that are included in the data packet received through the communication interface 21 and according to a correspondence between the service chain and the forwarding rule of the service chain.

As an optional implementation manner, the establishing, by the processor 22, the correspondence between the traffic flow and the forwarding rule of the service chain according to information about the traffic flow and information about the service chain that are included in a data packet received through the communication interface 21 and according to a correspondence between the service chain and the forwarding rule of the service chain includes: generating, by the processor 22, a flow table entry according to the information about the traffic flow and the information about the service chain in the data packet received through the communication interface 21 and the correspondence between the service chain and the forwarding rule of the service chain, where a match field of the flow table entry includes the information about the traffic flow, and the instruction field includes the forwarding rule.

Correspondingly, the obtaining, by the processor 22, the forwarding rule of the service chain according to the traffic flow which the data packet received from the SE belongs to and a correspondence between the traffic flow and the forwarding rule of the service chain includes: obtaining, by the processor 22, information in the instruction field of the corresponding flow table entry according to the traffic flow which the data packet received from the SE belongs to.

In addition, the processor 22 is further configured to receive, through the communication interface 21, the forwarding rule of the service chain delivered by an SPC.

The processor 22 is further configured to establish the correspondence between the traffic flow and the service chain or the correspondence between the traffic flow and the forwarding rule of the service chain when instruction information delivered by the SPC is received through the communication interface 21, where the instruction information is used for instructing the Switch to establish the correspondence, or when it is determined according to configuration information that the correspondence needs to be established.

The processor 22 is further configured to report, to the SPC through the communication interface 21, that the device has a capability of establishing the correspondence. Certainly, the SPC may determine, according to local configuration information, whether the data packet routing device has the capability of establishing the correspondence.

The data packet routing device in Embodiment 7 and Embodiment 8 of the present invention may be the Switch involved in Embodiment 1 to Embodiment 6 of the present invention, or another network device having the same function.

In the method and device described in the embodiments of the present invention, after an SPC delivers a forwarding rule corresponding to a service chain to a Switch, the Switch can process, according to the forwarding rule, a traffic flow corresponding to the same service chain. In this way, the SPC does not need to deliver a forwarding rule corresponding to each traffic flow to the Switch, thereby reducing signaling interaction between the SPC and the Switch; in addition, rules stored in the Switch are reduced, thereby saving the storage space of the Switch. Even if a data packet which arrives at the Switch does not include information about the service chain, the Switch can determine, according to a saved correspondence between information about the traffic flow and the information about the service chain or correspondence between information about the traffic flow and the forwarding rule of the service chain, the forwarding rule used when the data packet is routed, so that the solutions of the embodiments of the present invention are more versatile and flexible.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present application may use a form of a computer program product that is implemented on one or more computer-usable storage media (including but is not limited to a disk memory, a CD-ROM, an optical memory, and the like) that include computer usable program code.

The present invention is described with reference to the flowchart and/or block diagram of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or inane or more blocks in the block diagrams.

Although the exemplary embodiments of the present invention are already described, a person skilled in the art may make other alterations or modifications to these embodiments once learning a basic creative concept. Therefore, the appended claims are intended to be explained as including the exemplary embodiments and all alterations and modifications which fall within the scope of the present invention.

Obviously, a person of ordinary skill in the art can make modifications and variations to the embodiments of the present invention without deviating from the spirit and scope of the present invention. The present invention is intended to cover these modifications and variations provided that they fall within the scope of protection defined by the following claims and their equivalent technologies.

What is claimed is:

1. A data packet routing method, comprising:
   receiving, by a switch, a data packet from a service enabler (SE);
   obtaining, by the switch according to a traffic flow which the data packet received from the SE belongs to, a forwarding rule of a service chain corresponding to the traffic flow; and
   routing, by the Switch according to the forwarding rule, the data packet received from the SE;
   wherein before receiving the data packet from the SE, the method further comprises:
      generating, by the switch, a flow table entry according to the forwarding rule, wherein a match field of the flow table entry comprises information about the service chain, and an instruction field of the flow table entry comprises the forwarding rule;
   wherein obtaining the forwarding rule comprises:
      obtaining, by the switch, the forwarding rule of the service chain according to the traffic flow which the data packet received from the SE belongs to and according to a first correspondence between the traffic flow and the service chain;
   wherein obtaining the forwarding rule of the service chain according to the traffic flow and the first correspondence comprises:
      obtaining, by the switch, the information about the service chain according to the traffic flow which the data packet received from the SE belongs to and according to the first correspondence,
      comparing, by the switch, the obtained information about the service chain with the match field of the flow table entry, and
      obtaining, by the switch, the forwarding rule in the instruction field of the flow table entry according to a comparison result.

2. The routing method according to claim 1, after obtaining the information about the service chain, the method further comprises:
   encapsulating, by the switch, the data packet received from the SE, so that the encapsulated data packet comprises the information about the service chain.

3. The routing method according to claim 1, wherein obtaining the forwarding rule further comprises: obtaining, by the switch, the forwarding rule of the service chain according to a second correspondence between the traffic flow and the forwarding rule of the service chain.

4. The routing method according to claim 3, further comprising:
   receiving, by the switch, a data packet sent by a network device, wherein the data packet sent by the network device comprises the information about the traffic flow and the information about the service chain; and
   establishing, by the switch, the second correspondence according to the information about the traffic flow and the information about the service chain which are comprised in the data packet sent by the network device, and further according to the generated flow table entry.

5. The routing method according to claim 1, wherein before generating the flow table entry, the method further comprises:
   receiving, by the switch, the forwarding rule of the service chain from a service path controller (SPC).

6. A data packet routing method, comprising:
   receiving, by a switch, a data packet from a service enabler (SE);
   obtaining, by the switch according to a traffic flow which the data packet received from the SE belongs to, a forwarding rule of a service chain corresponding to the traffic flow; and routing, by the switch according to the forwarding rule, the data packet received from the SE;

wherein before receiving the data packet from the SE, the method further comprises:
generating, by the switch, a flow table entry according to the forwarding rule, wherein a match field of the flow table entry comprises information about the service chain, and an instruction field of the flow table entry comprises the forwarding rule;

wherein obtaining the forwarding rule comprises:
obtaining, by the switch, the forwarding rule of the service chain according to the traffic flow which the data packet received from the SE belongs to and according to a first correspondence between the traffic flow and the service chain;

receiving, by the switch, a data packet sent by a network device, wherein the data packet sent by the network device comprises the information about the traffic flow and the information about the service chain; and establishing, by the switch, the first correspondence according to the information about the traffic flow and the information about the service chain.

7. A data packet routing device, comprising:
a receiver, configured to receive a data packet from a service enabler (SE); and
a processor, configured to:
obtain, according to a traffic flow which the data packet received from the SE belongs to, a forwarding rule of a service chain corresponding to the traffic flow,
route, according to the forwarding rule, the data packet received from the SE,
generate a flow table entry according to the forwarding rule, wherein a match field of the flow table entry comprises information about the service chain, and an instruction field of the flow table entry comprises the forwarding rule,
obtain the forwarding rule of the service chain according to the traffic flow which the data packet received from the SE belongs to and according to a first correspondence between the traffic flow and the service chain,
obtain the information about the service chain according to the traffic flow which the data packet received from the SE belongs to and according to the first correspondence,
compare the obtained information about the service chain with the match field of the flow table entry, and obtain the forwarding rule in the instruction field of the flow table entry according to a comparison result.

8. The routing device according to claim 7, wherein the processor is further configured to encapsulate the data packet received from the SE, so that the encapsulated data packet comprises the information about the service chain.

9. The routing device according to claim 7, wherein:
the receiver is further configured to receive a data packet sent by a network device, wherein the data packet sent by the network device comprises the information about the traffic flow and the information about the service chain; and
the processor is further configured to establish the first correspondence according to the information about the traffic flow and the information about the service chain that are comprised in the data packet received by the receiver.

10. The routing device according to claim 7, wherein the processor is configured to obtain the forwarding rule of the service chain according to a second correspondence between the traffic flow and the forwarding rule of the service chain.

11. The routing device according to claim 10, wherein:
the receiver is further configured to receive a data packet sent by a network device, wherein the data packet sent by the network device comprises the information about the traffic flow and the information about the service chain; and
the processor is configured to establish the second correspondence according to the information about the traffic flow and the information about the service chain in the data packet received by the receiver and further according to the generated flow table entry.

12. The routing device according to claim 7, wherein the receiver is further configured to receive the forwarding rule of the service chain from a service path controller (SPC).

13. The routing device according to claim 12, wherein the receiver is further configured to receive instruction information from the SPC, wherein the instruction information is used for instructing the routing device to establish the flow table entry, or trigger the processor when it is determined according to configuration information that the flow table entry is to be established.

14. The routing device according to claim 13, further comprising:
a transmitter, configured to report, to the SPC, that the device has a capability of establishing the correspondence.

* * * * *